(12) United States Patent
Roy et al.

(10) Patent No.: US 7,965,737 B2
(45) Date of Patent: Jun. 21, 2011

(54) ADDRESSING METHOD FOR TRANSPORTING DATA ON A TELECOMMUNICATION NETWORK, CORRESPONDING ADDRESS STRUCTURE SIGNAL, GATEWAY AND COMPUTER PROGRAM

(75) Inventors: David Roy, Cornille (FR); Gilbert Bonizec, Saint Malo de Phily (FR); Franck Geslin, Rennes (FR)

(73) Assignee: France Telecom, Paris (FR)

( * ) Notice: Subject to any disclaimer, the term of this patent is extended or adjusted under 35 U.S.C. 154(b) by 497 days.

(21) Appl. No.: 12/065,213

(22) PCT Filed: Jul. 28, 2006

(86) PCT No.: PCT/EP2006/064803
§ 371 (c)(1),
(2), (4) Date: Oct. 30, 2008

(87) PCT Pub. No.: WO2007/025818
PCT Pub. Date: Mar. 8, 2007

(65) Prior Publication Data
US 2009/0222869 A1    Sep. 3, 2009

(30) Foreign Application Priority Data
Aug. 30, 2005 (FR) .................................... 05 08885

(51) Int. Cl.
*H04J 3/16* (2006.01)
(52) U.S. Cl. ....................................... 370/466; 370/235
(58) Field of Classification Search .................. 370/235, 370/395, 466, 260, 355, 498, 256, 401, 468, 370/474, 328, 331; 714/752, 755
See application file for complete search history.

(56) References Cited

U.S. PATENT DOCUMENTS

| | | | | |
|---|---|---|---|---|
| 5,666,487 | A * | 9/1997 | Goodman et al. | 709/246 |
| 6,574,242 | B1 * | 6/2003 | Keenan et al. | 370/474 |
| 6,788,690 | B2 * | 9/2004 | Harri | 370/395.52 |
| 6,977,914 | B2 * | 12/2005 | Paila et al. | 370/331 |
| 7,272,145 | B2 * | 9/2007 | Chen et al. | 370/395.5 |
| 7,336,680 | B2 * | 2/2008 | Sorenson et al. | 370/468 |

(Continued)

FOREIGN PATENT DOCUMENTS

WO    2004002146    12/2003

(Continued)

OTHER PUBLICATIONS

International Search Report from counterpart foreign Application No. PCT/EP2006/64803.

(Continued)

*Primary Examiner* — Thong H Vu
(74) *Attorney, Agent, or Firm* — David D. Brush; Westman, Champlin & Kelly, P.A.

(57) ABSTRACT

A method is provided for transforming a first transport level address into a second transport level address: the first address representing at least one digital data broadcasting service from at least one non-meshed broadcasting network and comprising data identifying the at least one digital data broadcasting service; the second address including a source field and/or a destination field in datagrams addressed to at least one communication network. The method includes the following steps: recovering data identifying the at least one digital data broadcasting service; inserting at least part of the identifying data in the second address of the datagrams.

12 Claims, 6 Drawing Sheets

U.S. PATENT DOCUMENTS

| | | | |
|---|---|---|---|
| 7,359,375 B2 * | 4/2008 | Lipsanen et al. | 370/355 |
| 7,369,520 B2 * | 5/2008 | Luoma et al. | 370/312 |
| 7,395,346 B2 * | 7/2008 | Pinder et al. | 709/232 |
| 7,471,645 B2 * | 12/2008 | Torres et al. | 370/256 |
| 7,693,062 B2 * | 4/2010 | Perkins et al. | 370/235 |
| 7,729,385 B2 * | 6/2010 | Muller et al. | 370/486 |
| 2002/0131428 A1 * | 9/2002 | Pecus et al. | 370/401 |
| 2003/0063615 A1 * | 4/2003 | Luoma et al. | 370/401 |
| 2003/0198223 A1 | 10/2003 | Mack et al. | 370/392 |
| 2006/0092867 A1 * | 5/2006 | Muller et al. | 370/312 |
| 2006/0153228 A1 * | 7/2006 | Stahl et al. | 370/466 |
| 2007/0008910 A1 * | 1/2007 | Muller et al. | 370/260 |
| 2007/0277077 A1 * | 11/2007 | Vesma et al. | 714/755 |
| 2008/0304520 A1 * | 12/2008 | Hannuksela et al. | 370/498 |
| 2008/0313522 A1 * | 12/2008 | Kim et al. | 714/752 |
| 2010/0034140 A1 * | 2/2010 | Song et al. | 370/328 |

FOREIGN PATENT DOCUMENTS

| | | |
|---|---|---|
| WO | WO 2004/002145 A1 | 12/2003 |

OTHER PUBLICATIONS

French Search Report from counterpart foreign Application No. FR 05/08885.

Ondems Media Gateway User Manual, Version 1.2.1, Mar. 2, 2005.

International Search Report dated Sep. 6, 2006 for Corresponding International Application No. PCT/EP2006/064803, filed Jul. 28, 2006.

English Translation of Written Opinion dated Mar. 4, 2008 for Corresponding International Application No. PCT/EP2006/064803, filed Jul. 28, 2006.

French Search Report dated Apr. 20, 2006 for corresponding French Application No. 0508885, filed Aug. 30, 2005.

Ondems "Ondems Media Gateway User Manual, Version 1.2.1" Ondems Media Gateway, [Online] Mar. 2, 2005, XP002377642, Retrieved from the Internet: URL:http://www.dektec.com/Products/DTX-440/Downloads/DTX-440.pdf>.

* cited by examiner

ADDRESSING METHOD FOR TRANSPORTING DATA ON A TELECOMMUNICATION NETWORK, CORRESPONDING ADDRESS STRUCTURE SIGNAL, GATEWAY AND COMPUTER PROGRAM

CROSS-REFERENCE TO RELATED APPLICATIONS

This application is a Section 371 National Stage Application of International Application No. PCT/EP2006/064803, filed Jul. 28, 2006 and published as WO 2007/025818A1 on Mar. 8, 2007, not in English.

FIELD OF THE DISCLOSURE

The field of the disclosure is that the addressing of datagrams within the network layer of a communications network, for example based on the IP (Internet Protocol). More specifically, the disclosure relates to the multicast addressing of datagrams during a packaging of the data coming from digital broadcasting services such as for example DVB or digital video broadcasting services.

Digital broadcasting services, for example DVB, are broadcast chiefly on large-scale broadcasting networks where the term "broadcast" refers to a single transmitter for several potential receivers. To a smaller extent, and since very recent times, these services are broadcast on IP-based meshed networks, for example the Internet. This broadcasting is achieved by means of the multicast addressing system defined by the IP.

BACKGROUND OF THE DISCLOSURE

1. Prior Art

The broadcasting of the programs and services of digital television has been to a great extent defined by the DVB consortium. Its architecture has been built around on several standards linked to the broadcasting of information flows or streams. Thus, the DVB services (TV programs, radio programs, channel selectors) are transported in multiplexed form in traditional broadcasting networks such as satellite networks and wireless networks. These multiplexes are constituted by multiplex operators. Each multiplex is referenced when manufactured by the unique identifier of the multiplex operator known as the ORGINAL_NETWORK_ID (or ONiD) as well as a multiplex identifier known as TRANSPORT_STREAM_ID (or TSiD). This pair {ONiD; TSiD} represents the unique address of a multiplex. Within a multiplex, an identifier is allocated to each DVB service known as SERVICE_ID (or SiD). The triplet {ONiD, TSiD, SiD} represents the unique address of a DVB service, for example a television channel. This address is used by the terminal of the user (digital decoder) to identify, decode and present the television program or radio program selected beforehand by the user.

The multicast services in IP-based communications networks are, for their part, defined by the multicast addressing principle. This addressing is done on an addressing range reserved for multicasting. Multicast addressing enables the broadcasting on an IP architecture of a same piece of information to a group of customers. Each IP information packet (datagram) contains a source address and an address known as a single-destination multicast address. A user asks for a multicast content, identified by a multicast IP address, by means of the IGMP (Internet Group Management Protocol) on the networks that implement the version 4 of the IP (IPv4) or by means of the MLD (Multicast Listener Discovery) protocol on networks that implement IP version 6 (IPv6). Thus, when a user links up through an Internet connection to an information broadcasting service, the application responsible for identifying, decoding and presenting this service in question will retrieve the datagrams whose destination address is that of the information broadcasting service.

The DVB consortium has specified the mechanisms for transporting and signaling DVB-on-IP services. This DVB-IP specification has been standardized at the ESTI (European Telecommunications Standardization Institute). These signals are thus packaged in IP datagrams. DVB has also defined a mechanism of service discovery and selection. This mechanism called SD&S (Service Discovery and Selection) provides, a table for the translation of addresses between the DVB and IP worlds in the form of metadata. For each DVB service, these items of metadata provide the pair consisting of the DVB address and the associated multicast IP address. The multicast IP addresses are defined by the operators controlling the gateways between the DVB world and the IP world.

2. Drawbacks of the Prior Art

One drawback of this prior art technique is related to the passage from the DVB world to the IP world. Indeed, only the operators are able to define the pairs {DVB address; associated multicast IP address} to authenticate services. The allocation of the addressing pairs without concentration between the operators does not make it possible to ensure the uniqueness of the pairs {DVB address; associated multicast IP address}.

A corollary drawback of this technique is that nowadays broadcasting networks of the operators are completely closed. Indeed, since the operator defines his own addressing plan, this plan is known only to the operator in question. This partitioning therefore limits the possibility of supplying new services. To add a new service, an independent provider has two possibilities:

he must obtain a multicast address from an operator;
he must do without operators and use any multicast address at the risk of it's being an address already used by an operator.

Yet another drawback of this prior art technique is that the uniqueness of a DVB service identified by its DVB address is no longer ensured during the encapsulation of the information stream in IP format. Indeed, a same IP address assigned to a DVB service can be re-used by another operator, another service or again by home gateways which can thus propose also the distribution of DVB-on-IP signals (locally on a user's private network for example) and cause problems of address overlapping. The deterioration of this uniqueness furthermore gives rise to a loss, at the transport level of the IP network, of the information on the original DVB multiplex, namely the triplet (formed by {ONiD; TSiD; SiD}).

Another drawback of this prior art technique is that the addition of a new broadcasting service in the IP world necessarily requires the creation of a pair {DVB address; associated multicast IP address} by the operator before this service can be broadcast on the IP network. This static approach cannot be envisaged for large-scale broadcasting.

SUMMARY

A method is provided for the conversion of a first transport level address into a second transport level address:
the first address representing at least one service for the broadcasting of digital data coming from at least one non-meshed broadcasting network and comprising pieces of data identifying said at least one digital data broadcasting service;

said second address comprising a source field and/or a destination field and being used in datagrams addressed to at least one communications network.

According to an embodiment of the invention, such a method comprises the following steps:

retrieval of the data identifying said at least one digital data broadcasting service;

insertion of at least one part of the pieces of identifier data in said second address of the datagrams.

Thus, an embodiment of the invention relies on an inventive approach to the creation of broadcasting addresses in communications network according to which the pieces of data identifying said first address are used to create said second address.

In other words, an embodiment of the invention relies on a dynamic approach to the creation of broadcasting addresses in taking account of the information present in said first address. This means that two different broadcasting services will never have the same broadcasting address.

Advantageously, said telecommunications network towards which the conversion is done is a network based on the IP.

This type of meshed network defines destination addresses known as multicast addresses used to broadcast information in the form of digitized data to several addressees while at the same time using one and only one address. It is therefore not necessary with this type of network to specifically address one addressee in particular.

Preferably, said pieces of identifier data enabling said conversion to be done belong to the group comprising at least:
one identifier of said original broadcasting network;
one identifier of the transport stream;
one identifier of said at least one digital data broadcasting service.

These pieces of data thus enable the origin of the digital data to be broadcast in the destination network to be identified with assurance of unicity.

Advantageously, said insertion of said identifier data is implemented in at least one of said fields forming said second transport level address.

Thus, the unicity of said first address is kept in said second address. This second address therefore preserves all the characteristics of the first one.

Preferably:
said at least one non-meshed broadcasting network conveys DVB type data;
said identifier of said original broadcasting network is the "ONiD" field of a DVB multiplex;
said transport stream identifier is the "TSiD" field of said DVB multiplex;
said identifier of said at least one digital data broadcasting service is the "SiD" field of a digital broadcasting service of said "DVB" multiplex.

In this context of conversion of a DVB type address into an IP type address, the source fields of the DVB address are used to ensure the distribution of digital video services to a set of addressees. The combination of the {ONiD; TSiD} fields identifies a multiplex of services. The addition of the "SiD" field to this doublet enables identification of a unique service within the multiplex.

Preferably, when said second address is of the IPv4 type, said insertion of said identifier data is accomplished as follows:

the two least significant bytes of said source field take the value of said original network identifier "ONiD";
the first byte of said destination fields takes a constant value that is characteristic of the transmission of the DVB digital broadcasting services;
the second and third bytes of said destination fields take the value of said transport stream identifier "TSiD";
the fourth byte of said destination fields takes a value representing said service identifier.

Thus, an address called a multicast address is built in using data coming from the DVB multiplex. The IPv4 address built consists of two fields: source and destination. The source field identifies the origin of data. In this respect, the insertion in this field of the value of "ONiD" enables the identifying of the network that is at the origin of the transmission of the multiplex. The bytes which are left free can serve to identify the gateway responsible for said conversion for example.

The destination field identifies the receivers of the transported data. The fixing of a characteristic value to the first byte of this field enables the reservation of a range of addresses for the use of the broadcasting of the digital video services on IP. The second and third bytes ensure unicity originating in the multiplex through the value "TSiD" and the value "ONiD" contained in the source field. Finally, the fourth byte is used to identify a service in particular.

Advantageously, said value representing said service identifier is determined as follows:
[11111110] in the case of a distribution of the set of said at least one DVB digital broadcasting service;
a binary value coming from a re-numbering of said service identifier <<SiD>> on 8 bits and included between [00000000] and [11111101] in the case of a distribution of only one of said at least one DVB digital broadcasting service.

It is thus possible to address either the complete content of a multiplex or a specific service of this multiplex in carrying out a re-numbering of the services that is adapted to the size of the fields of the IPv4 addresses.

Preferably, said re-numbering of said service identifier "SiD" on 8 bits comprises the following steps:
counting of a set of said at least one DVB digital broadcasting service identified by said original network identifier "ONiD" and said transport stream identifier "TSiD";
allocation of an increasing binary value to each element of said set.

Preferably, when said second address is of an IPv6 type, said insertion of said identifier data is accomplished as follows:
the two least significant bytes of said source field take the value of said original network identifier "ONiD";
the third byte of said destination field takes a constant value characteristic of the transmission of the DVB digital broadcasting services;
the thirteenth and fourteenth bytes of said destination field take the value of said transport stream identifier "TSiD";
the fifteenth and sixteenth bytes of said destination field take a value representing said service identifier.

Thus, an address known as a multicast address is built in using data coming from the DVB multiplex. The IPv6 address built consists of two fields: source and destination. The source field identifies the origin of the data. In this respect, the insertion in this field of the value of "ONiD" enables identification of the network originating the transmission of the multiplex. The bytes which are left free can serve to identify the gateway responsible for said conversion, for example.

The destination field identifies the receivers of the transported data. The two first bytes, according to the IPv6 standards, are reserved during the use of an multicast type IP address. The fixing of a characteristic value on the third byte of this field reserves a range of addresses for the use of the broadcasting of the digital broadcasting services on IP. The thirteenth and fourteenth bytes provide for the unicity of the source of the multiplex through the value "TSiD" and the value "ONiD" contained in the source field. Finally, the fifteenth and sixteenth bytes are used to identify a service in particular.

Advantageously, said value representing said service identifier is determined as follows:
[1111111] [11111101] in the case of a distribution of the set of at least one DVB digital broadcasting service;
the value of said identifier of the service "SiD" in the case of a distribution of only one of said at least one DVB digital broadcasting service.

It is thus possible to address either the full content of a multiplex or a specific service of this multiplex by inserting the value of the "SiD".

An embodiment of the invention also relates to the structure of a signal representing a second transport level address of this kind, comprising at least one field comprising at least one of said pieces of data identifying said at least one digital data broadcasting service.

In at least one embodiment, such a signal is obtained by:
retrieval of the data identifying said at least one digital data broadcasting service;
insertion of at least one part of the pieces of identifier data in said second address of the datagrams.

In the at least one embodiment, the invention also relates to the gateways implementing the above-described method, the address signals thus built as well as the corresponding computer programs.

Thus, a single gateway may, for example, comprise means of converting addresses of services coming from the DVB multiplex into multicast addresses used in the IP version 4 and/or version 6.

BRIEF DESCRIPTION OF THE DRAWINGS

Other features and advantages shall appear more clearly from the following description of a preferred embodiment, given by way of a simple, non-exhaustive illustration, and from the appended drawings, of which.

DETAILED DESCRIPTION OF ILLUSTRATIVE EMBODIMENTS

1. Reminder of the Principle of an Embodiment of the Invention

In an embodiment of the present invention, the focus of interest therefore is the creation of a general broadcasting address on a communications network from elements that identify and constitute a source address of a non-meshed communications network. This address creation enables the efficient management of the passage of digital data from one network to another through the availability of a comprehensive translation method. It is thus possible to propose a technique for making data travel between a video digital services broadcasting network and a UMTS type communications network, being addressed to mobile communications terminals.

One particular embodiment of the invention therefore focuses on the creation of a single multicast broadcasting address as a function especially of the original DVB broadcasting services and/or of the transport protocol used to convey the original service.

Figure 1:
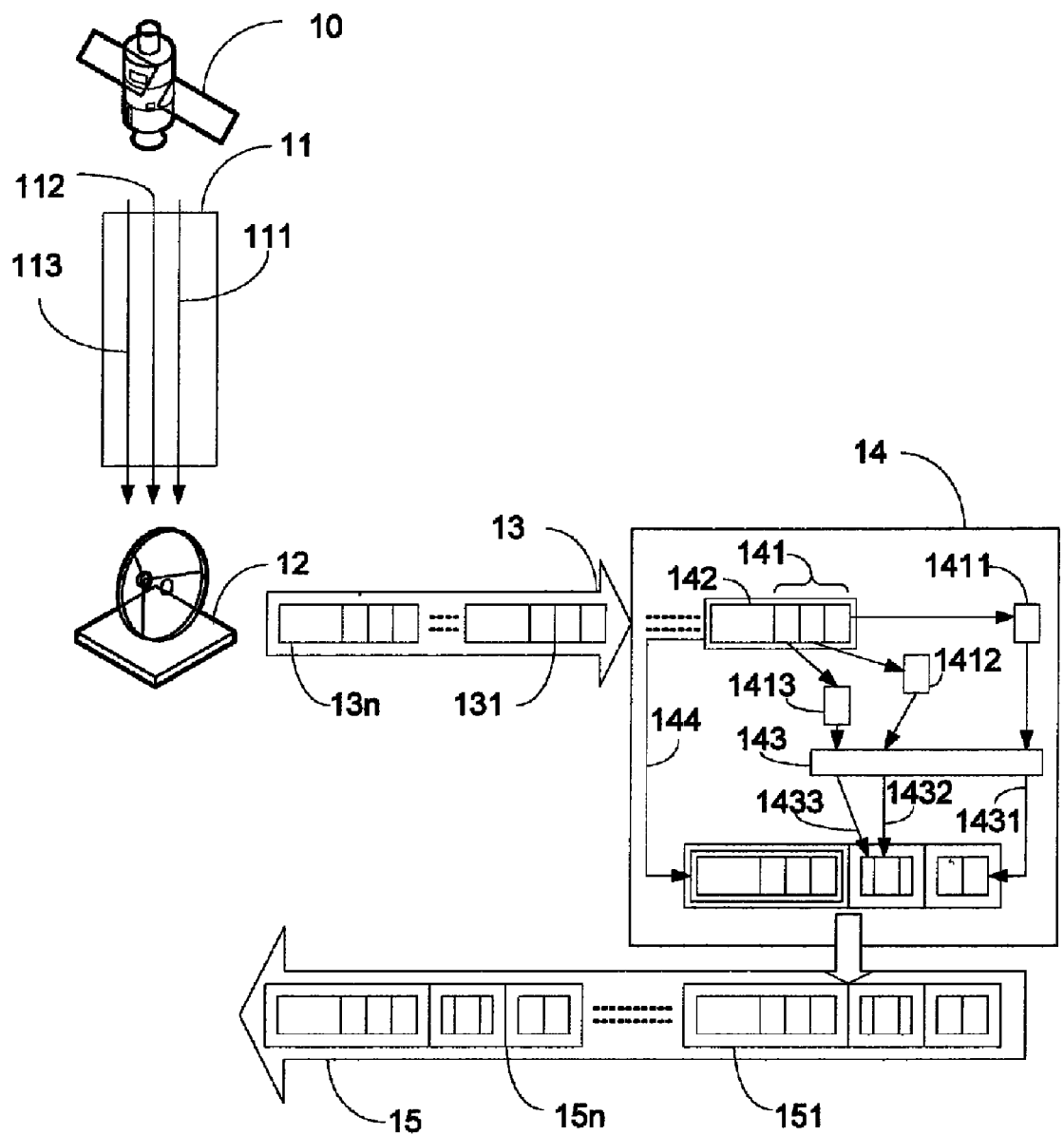
FIG. 1 shows the general principle of computation of addresses for the passage of the information stream from the DVB broadcasting network to the IP network.

The general principle of an embodiment of the invention relies on the integration of the constituent data of the original address of the DVB service in the addressing fields of the datagram of the destination protocol by means of a gateway. This principle is described in FIG. 1.

A gateway 14 receives (13) through an appropriate reception means 12 (satellite antenna, terrestrial digital receiver), a DVB multiplex 11 coming from an ad hoc broadcasting means 10 (such as a satellite or wireless antenna). This multiplex 11 is identified by the pair {ONiD, TSiD}. It contains a set of services 111, 112 and 113 identified by their "SiD". These services are transmitted to the gateway 14 in the form of data packets (131, ..., 13n). The gateway receives these data packets. They include an address 141 and data 142. These addresses comprise the triplet {ONiD, 1411; TSiD, 1412; SiD, 1413} identifying the service of the multiplex.

In this embodiment, each element (1411, 1412, 1413) forming the triplet {ONiD; TSiD; SiD} of the original DVB broadcasting address is formed by 16 bits (2 bytes). The original address therefore has a length of 48 bits (6 bytes in all). However, it is possible to envisage a case where the addressing lengths of the original fields are different.

In the distribution on IP of a DVB service coming from a broadcast network, the gateway:
identifies the DVB service which is a source at least of the triplet forming its source address;
creates (143) a pair of IP addresses for the DVB service by:
inserting (1431, 1432, 1433) its addresses into the IP datagram;
encapsulates (144) the DVB packet in the IP datagram;
sends (15) the datagram (151) on the network after the others (15n).

The pair of addresses inserted in the datagram is formed by the following elements:
an IP source field equal at least to the "ONiD" field 1411 coming from the operator of the multiplex;
a (multicast) destination IP field consisting of:
at least one "TSiD" (transport stream ID) field 1412;
optionally, the "SiD" (service ID) field 1413.

Figure 6:
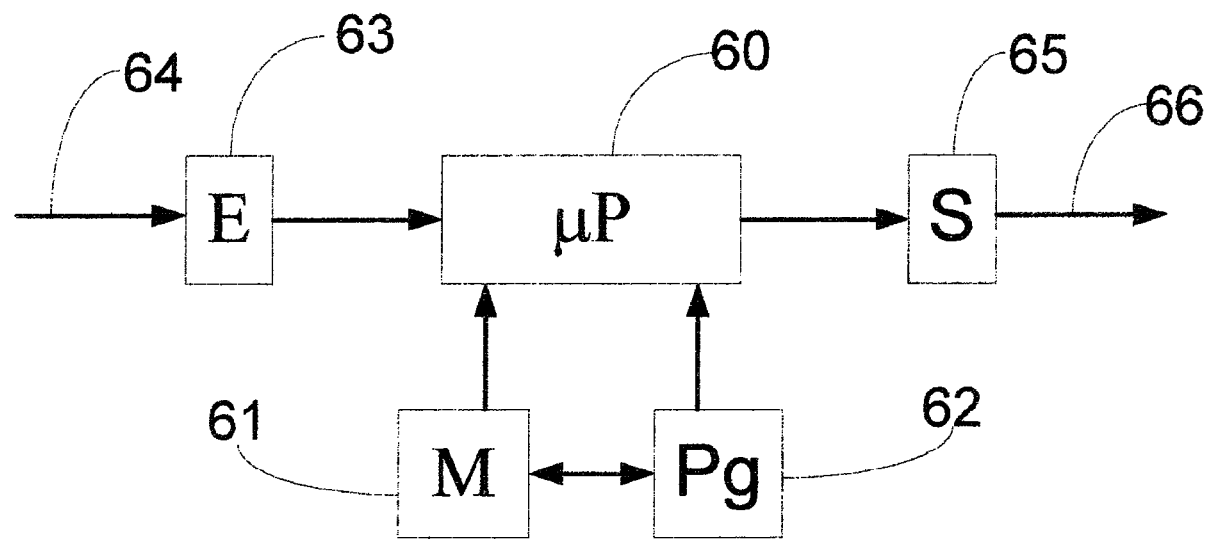
FIG. 6 provides a schematic view of the hardware structure of the gateway of FIG. 1.

The structure of the gateway is illustrated schematically in FIG. 6. It also comprises a memory M 61, and a processing unit 60 equipped with a microprocessor IP which is driven by a computer program (or application) Pg 62. The processing unit 60 receives at input, through a network input interface module E 63, customer requests and/or responses 64 which the microprocessor μP processes according to the instructions of the program Pg 62 to generate commands and/or responses 66 which are transmitted through the network output interface module S 65.

Here below, we present especially the case of the implementation of this method in the context of the IPv4 protocol and the IPv6 protocol. It is clear however that the invention is not limited to this particular application but may also be implemented in many other fields for example in the field of the broadcasting of DVB services for UMTS and GPRS type mobile communications terminals and more generally in all cases where the goals listed in the document are worthwhile.

2. Description of an Embodiment with the IPv4 Protocol

Figure 2:
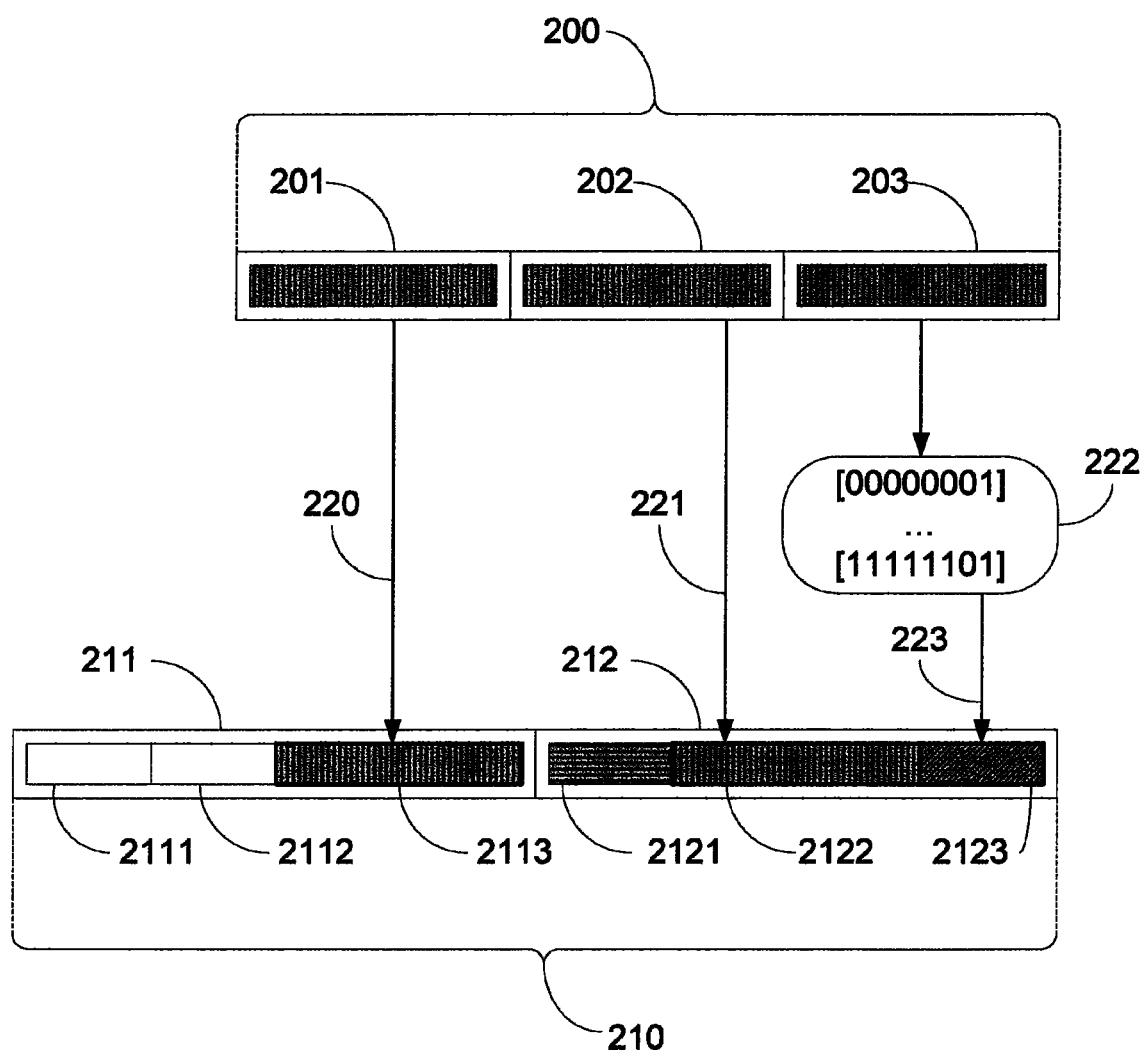
FIG. 2 illustrates the format of an IPv4 datagram and the filling of its header fields by applying the method of generation in the case of the broadcasting of only one service.
Figure 3:
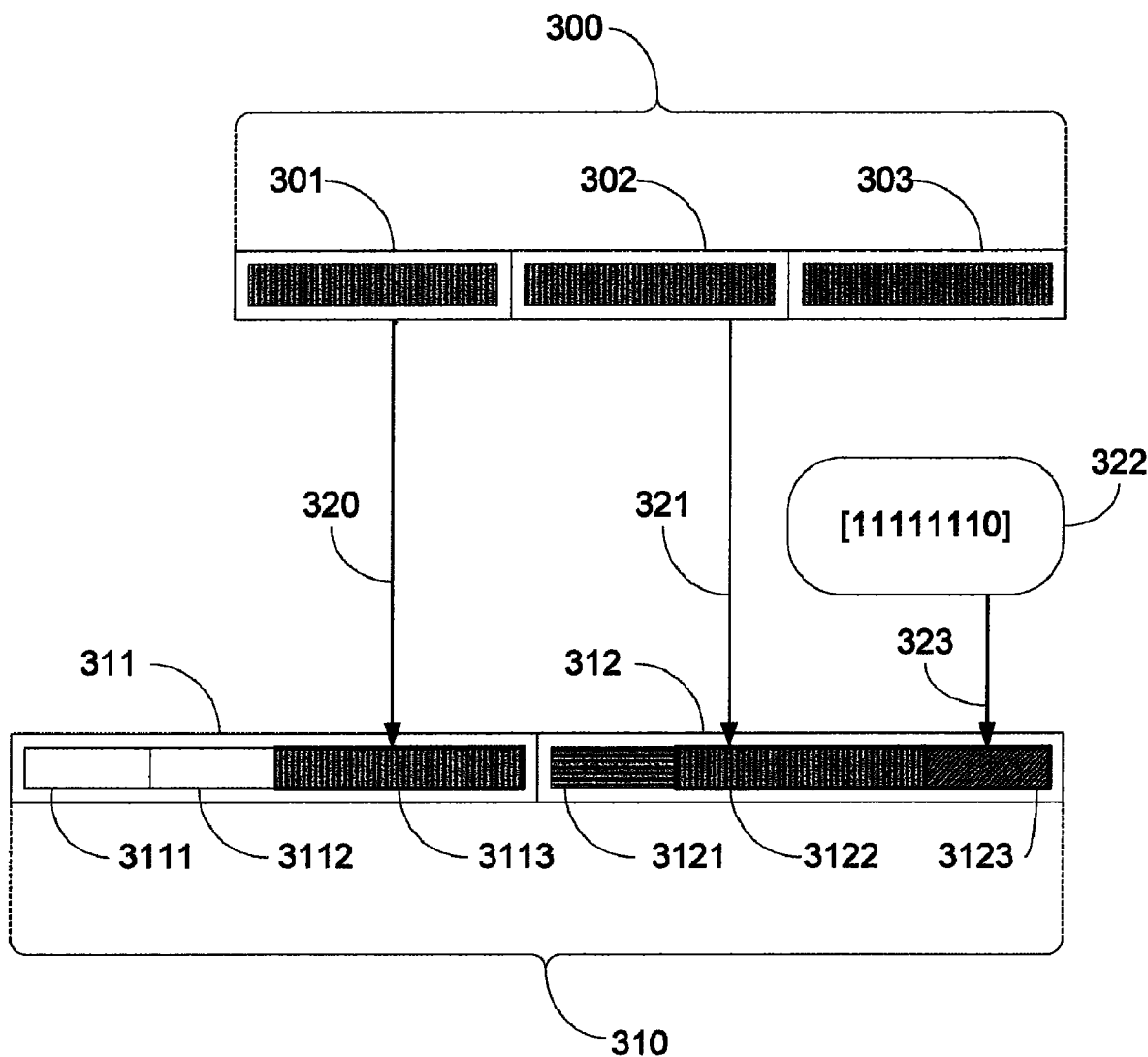
FIG. 3 describes the process of production of the address IPv4 in the case of the broadcasting of an entire multiplex.

Referring to FIGS. 2 and 3, a particular embodiment of the method for translating addresses of DVB broadcast services applied to the version 4 of IP network is presented.

In its version 4, the IP protocol defines a datagram header comprising a source address field and a destination address field. These two fields are respectively sized four bytes (32 bits).

2.1 Distribution of a DVB Service

FIG. 2 presents the case of a distribution of a single DVB service by using a multicast IPv4 address. To create a single multicast IPv4 address, the gateway 20:
  uses (220) the source IP address field 211 of the datagram 210 to identify the multiplexes operator "ONiD 201. The two least significant bytes 2113 then takes as their value the "ONiD" field of the multiplex. The two most significant bytes 2111, 2112 are left free;
  uses the destination IP address field 212 of the datagram 210 to identify the DVB service. This field is the DVB service broadcast (class D) multicast IP address. The method of computation of this address is the following:
  the first byte (significant byte) 2121 indicates whether the service transported is of the DVB type by inserting a DVB-specific value therein;
  the second and third bytes 2122 indicate the original multiplex of the service. These two bytes then take (221) the value of the "TSiD" field 202 of the original multiplex;
  the last byte 2123 identifies the original service. However, a re-numbering 222 of the DVB "Services ID" 203, initially formed by 16 bits, is necessary to encode the information on 8 bits. The re-numbering method 222 is defined as follows:
  classification of the ID services of a multiplex by rising order;
  allocation of an identifier in rising order to each service from the value 1 up to 253 (incrementation in steps of 1). The value 254 is reserved to report the fact that the service level is not addressed. The DVB "SiD" field is then overlooked. In this case, only the multiplex level is addressed (cf. 6.2.2);
  the value is then inserted (223) in the last byte 2123.

In an alternative embodiment, the destination IP address may be formed by two "TSiD" and "SiD" fields without it's being necessary to re-number the latter field. Indeed, it is possible to assign the indication of the transported service to the source address of the IP datagram.

In yet another embodiment, it is possible to re-number all the "ONiD", "TSiD" and "SiD" identifiers according to a process similar to the one described further above so as to fill only the destination address of the IP datagram and insert in the source address of this same datagram the address of the gateway that performs the address translation.

2.2 Distribution of all the Services of a DVB Multiplex

FIG. 3 presents the case of a distribution of a DVB multiplex containing several DVB services by means of a multicast IPv4 address. To create a single multicast IPv4 address, the gateway 30:
  uses (320) the source IP address field 311 of the datagram 310 to identify the multiplex operator "ONiD" 301. The two least significant bits 3113 then take (320) the "ONiD" field of the multiplex as their value. The two most significant bytes 3111, 3112 are left free;
  uses the destination IP address field 312 of the datagram 310 to identify the DVB services. This field is the DVB service broadcasting (class D) multiplex IP address. The method of computation of this address is as follows:
  the first byte (significant byte) 3121 indicates whether the service transported is of the DVB type by inserting a DVB-specific value therein;
  the second and third bytes 3122 indicate the original multiplex of the service. These two bytes then take (321) the value of the "TSiD" field 202 of the original multiplex;
  the last byte 3123 reports the fact that the addressing is not done at the service level but for the entire multiplex. It takes (323) the decimal value 254 [11111110] (322).

In this example, the identifier of the service 303 is not used to constitute the destination address of the datagram 310.

3. Description of an Embodiment with the IPv6 Protocol

Figure 4:
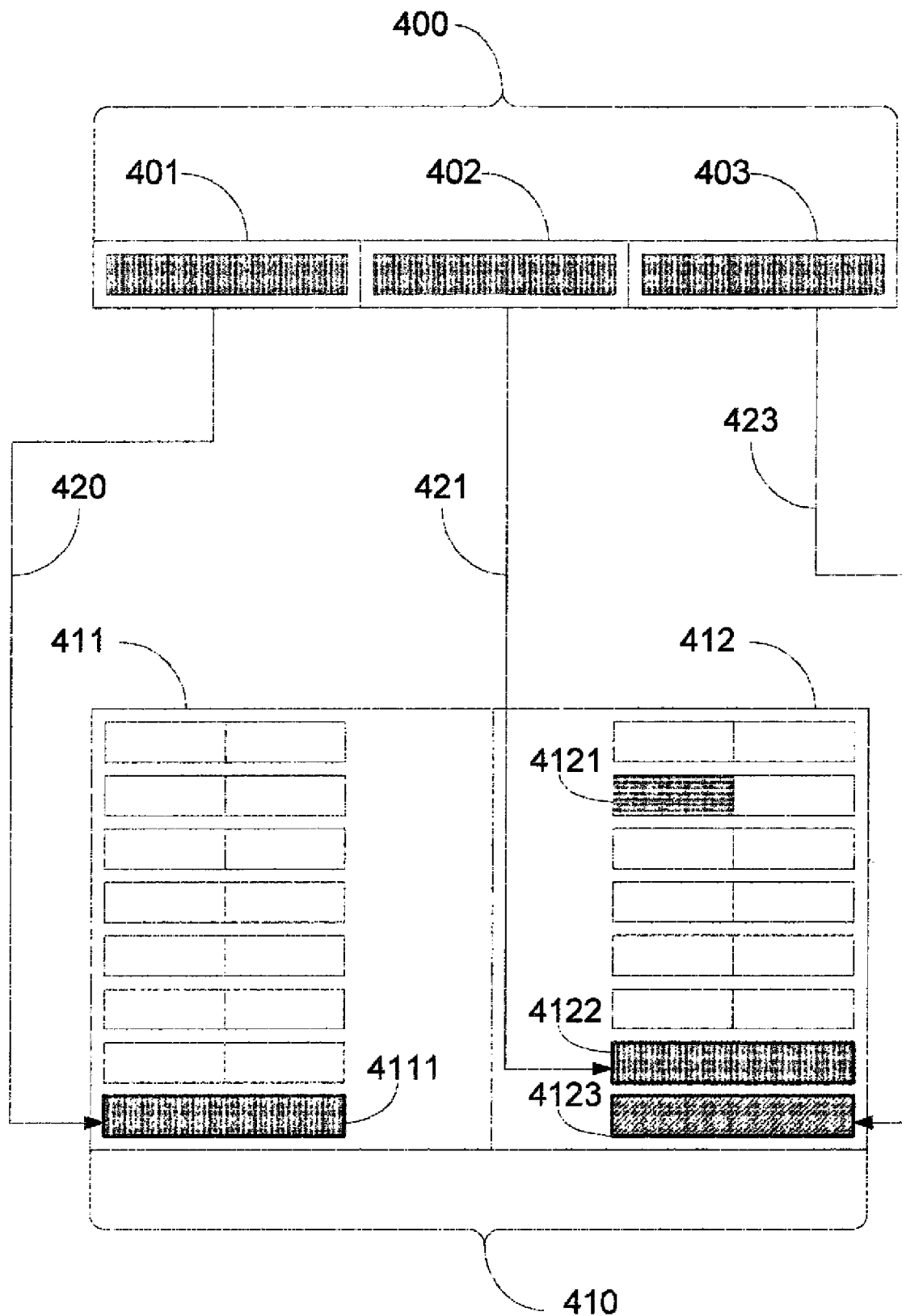
FIG. 4 illustrates the format of an IPv6 datagram and the filling of its header fields by applying the method of generation in the case of the broadcasting of only one service.
Figure 5:
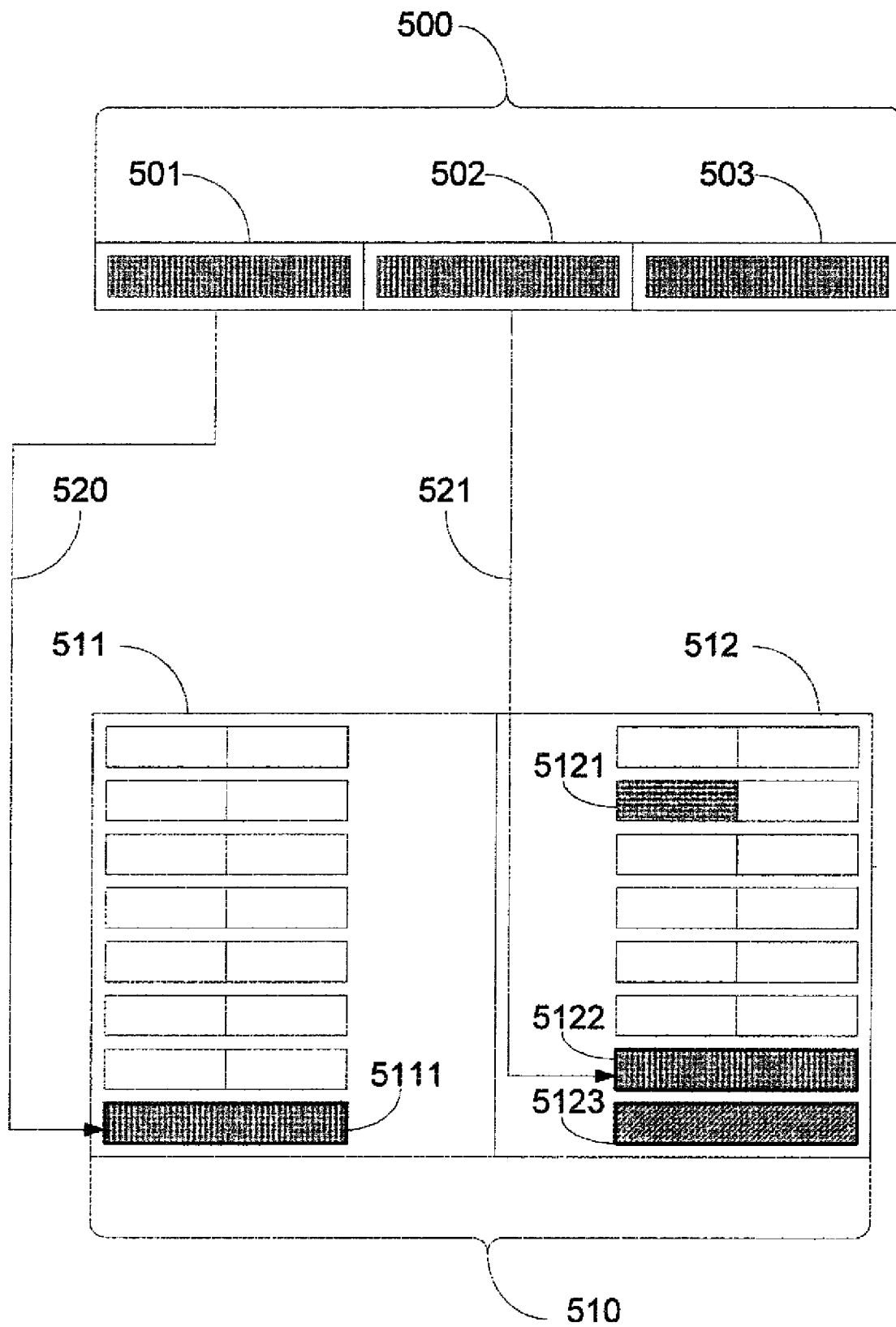
FIG. 5 describes the process of production of the IPv6 address in the case of the broadcasting of an entire multiplex.

Referring to FIGS. 4 and 5, a particular embodiment is presented of the method for the translation of DVB broadcast service addresses applied to the IP network in version 6.

In its version 6, the IP protocol defines a datagram header comprising a source address field and a destination address field. These two fields respectively measure 16 bytes (128 bits).

3.1 Distribution of a DVB Service

FIG. 4 presents the case of a distribution of a single DVB service by means of a multicast IPv6 address. To create a single multicast IPv6 address, the gateway 40:
  uses (420) the source IP address field 411 of the datagram 410 to identify the multiplex operator "ONiD". The two least significant bytes 4111 then take (420) the "ONiD" field of the multiplex as their value. This first step is used to generate the source address of the datagram. In another embodiment, given the format of the address (16 bytes), the source address may contain other pieces of information such as the indication used to define the fact that this is a service provider address;
  uses the "destination IP address field" 412 of the datagram 410 to identify the DVB multiplex. The information inserted in this field constitutes the DVB service broadcasting multicast IP address. In a multicast address of the IPv6 protocol, the 16 most significant bits are reserved and therefore cannot be used. The method of computation of the 112 remaining bits of this address is as follows:
  the third byte 4121 indicates that the service transported is truly of a DVB type, in reserving a specific value to DVB;
  the following 9 bytes (72 bits) are unused;
  the four remaining (least significant) bytes are constituted 421, 423 respectively by the value of the "TSiD" 402 and "SiD" 403.

3.2 Distribution of a DVB Multiplex

FIG. 5 shows the case of a distribution of a single DVB service by means of a multicast IPv6 address. To create a unique multicast IPv6 address, the gateway 50:
  uses (520) the source IP address field 511 of the datagram 510 to identify the multiplex operator "ONiD". The two least significant bytes 5111 then take (520) the "ONiD" field of the multiplex as their value. This first step is used to generate the source address of the datagram. In another embodiment, given the format of the address (16 bytes), the source address may contain other pieces of information such as the indication used to define the fact that this is a service provider address;

uses the "destination IP address field" 512 of the datagram 510 to identify the DVB multiplex. The information inserted in this field constitutes the DVB service broadcasting multicast IP address. In a multicast address of the IPv6 protocol, the 16 most significant bits are reserved and therefore cannot be used. The method of computation of the 112 remaining bits of this address is as follows:

the third byte 5121 indicates that the service transported is truly of a DVB type, in reserving a specific value to DVB;

the following 9 bytes (72 bits) are unused;

the next 2 bytes 5122 will be constituted (521) by the value of the "TSiD" 502;

finally, the last two bytes 5123 report the fact that the service level is not addressed. They take the decimal value 65534.

In this example, the identifier of the service 503 is not used to constitute the destination address of the datagram 510.

An aspect of the disclosure provides a technique that ensures a sharing of the "multicast" addressing space as a function of the original DVB addresses.

An aspect of the disclosure enables the removal of the partition between the broadcasting networks of the operators.

A further aspect of the disclosure provides for the uniqueness of the DVB services retransmitted on the communications network in eliminating the problems of address overlapping and in eliminating the loss of the address of the DVB service originating the broadcast on the communications network.

A further aspect of the disclosure provides a technique of this kind that reduces the actions performed by operators during the addition of new broadcasting services coming from the DVB networks.

Although the present disclosure has been described with reference to one or more examples, workers skilled in the art will recognize that changes may be made in form and detail without departing from the scope of the disclosure and/or the appended claims.

The invention claimed is:

1. Method for conversion of a first transport level address into a second transport level address:
said first address representing at least one service for broadcasting digital data coming from at least one non-meshed broadcasting network and comprising pieces of data identifying said at least one digital data broadcasting service;
said second address comprising at least one of a source field or a destination field and being used in datagrams addressed to at least one communications network, and
wherein the method implements the following steps:
retrieval of said pieces of data identifying said at least one digital data broadcasting service; and
insertion of at least one part of said pieces of identifier data in said second address of said second datagrams.

2. Method of conversion according to claim 1, wherein said telecommunications network is a network based on the IP protocol.

3. Method of conversion according to claim 1, wherein said pieces of identifier data belong to the group comprising at least:
one identifier of said original broadcasting network;
one identifier of the transport stream; and
one identifier of said at least one digital data broadcasting service.

4. Method of conversion according to claim 1, wherein said insertion of said identifier data is implemented in at least one of said fields forming said second transport level address.

5. Method of conversion according to claim 1, wherein:
said at least one non-meshed broadcasting network conveys DVB type data;
said identifier of said original broadcasting network is an "ONiD" field of a DVB multiplex;
said transport stream identifier is a "TSiD" field of said DVB multiplex; and
said identifier of said at least one digital data broadcasting service is an "SiD" field of a digital broadcasting service of said "DVB" multiplex.

6. Method of conversion according to claim 5, wherein, when said second address is of IPv4 type, said insertion of said identifier data is accomplished as follows:
two least significant bytes of said source field take a value of said original network identifier "ONiD";
a first byte of said destination fields takes a constant value that is characteristic of the transmission of the DVB digital broadcasting services;
second third bytes of said destination fields take a value of said transport stream identifier "TSiD";
a fourth byte of said destination fields takes a value representing said service identifier.

7. Method according to claim 6, wherein said value representing said service identifier is determined as follows:
[11111110] in the case of a distribution of the set of said at least one DVB digital broadcasting service;
a binary value coming from a re-numbering of said service identifier <<SiD>> on 8 bits and included between [00000000] and [11111101] in the case of a distribution of only one of said at least one DVB digital broadcasting service.

8. Method according to claim 7 wherein said re-numbering of said service identifier "SiD" on 8 bits comprises the following steps:
counting of a set of said at least one DVB digital broadcasting service identified by said original network identifier "ONiD" and said transport stream identifier "TSiD"; and
allocation of an increasing binary value to each element of said set.

9. Method of conversion according to claim 5, wherein, when said second address is of an IPv6 type, said insertion of said identifier data is accomplished as follows:
two least significant bytes of said source field take a value of said original network identifier "ONiD";
a third byte of said destination field takes a constant value characteristic of the transmission of the DVB digital broadcasting services;
thirteenth and fourteenth bytes of said destination field take a value of said transport stream identifier "TSiD"; and
fifteenth and sixteenth bytes of said destination field take a value representing said service identifier.

10. Method according to claim 9 wherein said value representing said service identifier is determined as follows:
[1111111] [11111101] in the case of a distribution of the set of at least one DVB digital broadcasting service;
the value of said identifier of the service "SiD" in the case of a distribution of only one of said at least one DVB digital broadcasting service.

11. Gateway comprising means for converting a first transport level address into a second transport level address:

said first address representing at least one service for the broadcasting of digital data coming from at least one non-meshed broadcasting network and comprising pieces of data identifying said at least one digital data broadcasting service;

said second address comprising at least one of a source field or a destination field and being used in datagrams addressed to at least one communications network, and wherein the gateway comprises:

means for retrieval of said pieces of data identifying said at least one digital data broadcasting service, and means for insertion of at least one part of said pieces of identifier data in said second address of said datagrams.

12. Computer program product stored in a Non-transitory computer-readable medium and/or executable by a microprocessor, wherein the product comprises program code instructions for implementation a method for conversion of a first transport level address into a second transport level address:

said first address representing at least one service for broadcasting digital data coming from at least one non-meshed broadcasting network and comprising pieces of data identifying said at least one digital data broadcasting service;

said second address comprising at least one of a source field or a destination field and being used in datagrams addressed to at least one communications network, and wherein the method implements the following steps:

retrieval of said pieces of data identifying said at least one digital data broadcasting service; and insertion of at least one part of said pieces of identifier data in said second address of said second datagrams.

* * * * *

UNITED STATES PATENT AND TRADEMARK OFFICE
CERTIFICATE OF CORRECTION

| | |
|---|---|
| PATENT NO. | : 7,965,737 B2 |
| APPLICATION NO. | : 12/065213 |
| DATED | : June 21, 2011 |
| INVENTOR(S) | : Roy et al. |

Page 1 of 1

It is certified that error appears in the above-identified patent and that said Letters Patent is hereby corrected as shown below:

In the Claims

Column 10:

Line 25, delete "second third" and insert --second and third--.

Column 11:

Line 15, delete "and/or" and insert --and--.

Signed and Sealed this
Thirtieth Day of June, 2015

Michelle K. Lee
*Director of the United States Patent and Trademark Office*